Nov. 17, 1970                H. S. STEWART ET AL                3,541,323
                              LASER BEAM PROJECTOR

Filed May 16, 1968                                          3 Sheets-Sheet 1

INVENTORS
HAROLD S STEWART
THOMAS P DAVIS
BY Ralph L. Cadwallader
Cadwallader and Kelly

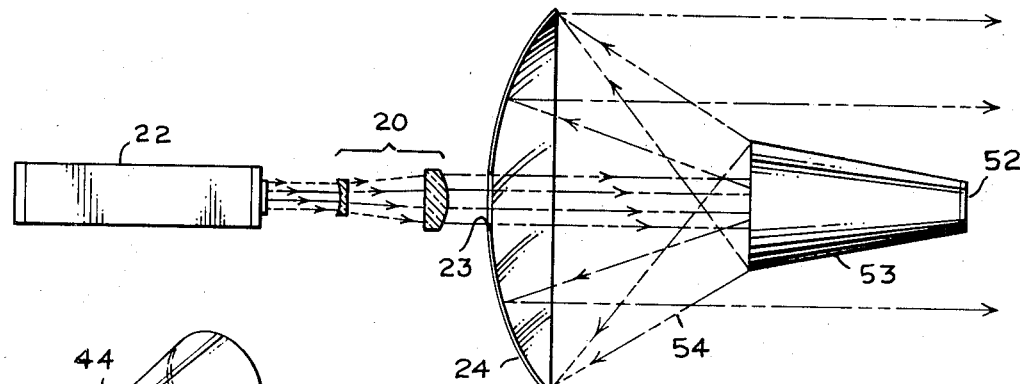
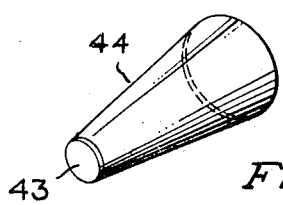
Fig 11
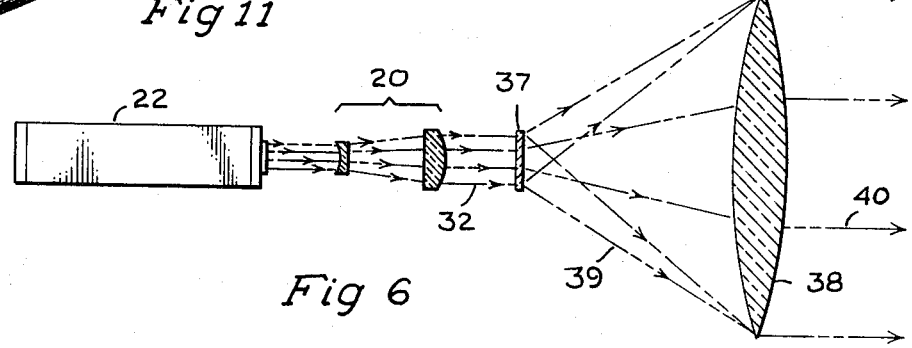
Fig 6
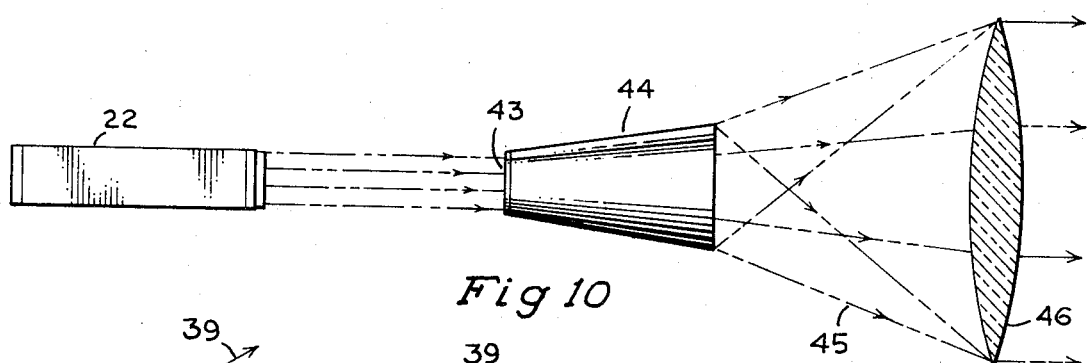
Fig 10
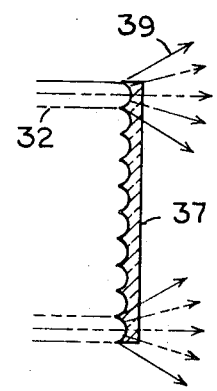
Fig 7
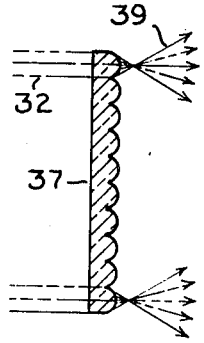
Fig 8

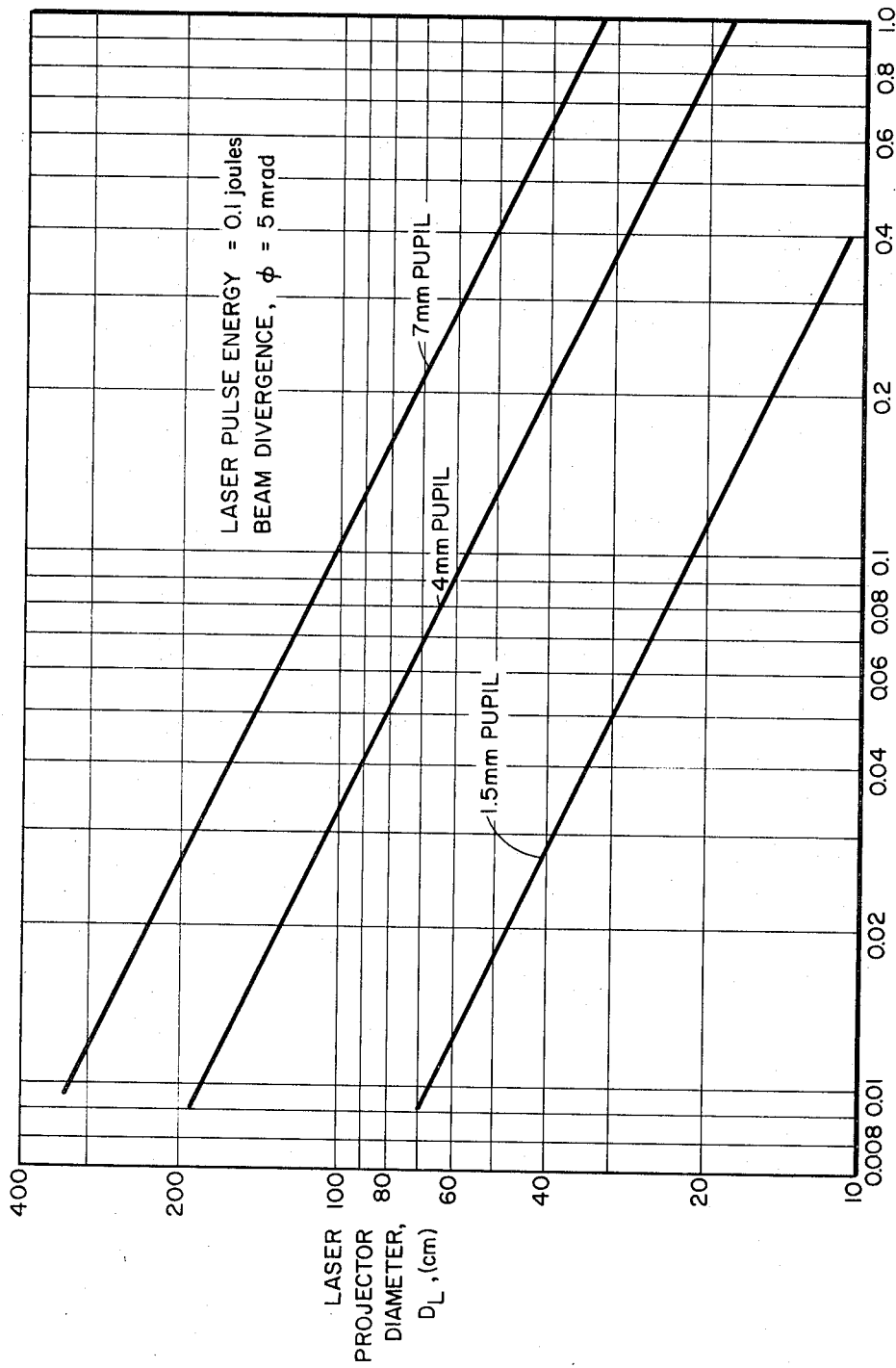

United States Patent Office 3,541,323
Patented Nov. 17, 1970

---

3,541,323
LASER BEAM PROJECTOR
Harold S. Stewart, Santa Monica, and Thomas P. Davis, Woodland Hills, Calif., assignors, by mesne assignments, to EG&G, Inc., Bedford, Mass., a corporation of Massachusetts
Filed May 16, 1968, Ser. No. 729,657
Int. Cl. F21v *11/00;* G02b *17/00*
U.S. Cl. 240—46.01
14 Claims

---

ABSTRACT OF THE DISCLOSURE

A laser beam projector includes a projection mirror or its equivalent, a laser, and beam directing optics for directing the laser beam to a beam scattering surface located at the focal plane of the mirror and adapted to scatter the beam toward the mirror. The scattering surface may be a mosaic of tiny mirrors or lenses each having the same F/number as the projection mirror.

---

The present invention relates to lasers and in particular to a laser beam projector wherein the projected laser beam may be safely viewed by the human eye.

The lens of the eye forms images of objects within the visual field. Depending on the state of accommodation and the wavelength involved, these images lie on or near the retina wherein visual responses are invoked through absorption of the incident radiation. The transmission of the eye limits the wavelength interval for which such images can be formed to approximately 0.3 micron to 1.5 microns. The range of accommodation (including myopia and hyperopia) is such that, at given times and for a population group, any wavelength within this interval may be sharply focused on the retinas of some members of the group. For this reason, visual safety standards, when applied to laser sources, must be established on the assumption that the eye is in sharp focus for the wavelength of the laser involved.

The lasers involved in most telemetric or communication systems emit essentially parallel light. For this reason, the eye can form a "point" (i.e., minimum size) image of the flux from the laser at all ranges. In many cases optical systems are used to increase or decrease the divergence of the light from the laser. In general, these systems preserve the laser beam characteristics which allow the eye to form "point" images for any separation of eye and laser. Because of this, safety standards are established on the assumption that whatever the range from the laser and whatever the technique of projection used with the laser, all of the flux incident on the pupil of the eye may be concentrated into a "point" image.

The size of the "point" image is determined by the pupil size (diffraction limit) and the lack of perfection of the eye as an optical system. In safety calculations it is usual to take the diameter of the disc formed on the retina by a point source to be 15 microns and to consider all of the energy passed by the pupil and transmitted by the eye to be uniformly distributed across this disc. Safety standards are set on the basis of acceptable power density (for CW lasers) or energy densities (for pulsed lasers) within the 15 micron disc.

The retinal injury threshold for short duration laser pulses depends upon retinal energy density, and is reasonably independent of the area exposed. In the case of longer duration laser pulses and continuous laser beams, injury will decrease with decreasing image size at a given retinal energy or power density. The precise relation between the threshold injury level and image size is not known. However, it may be stated that, in all cases, if a threshold level of energy or power density is established for a large (say 150 to 200 microns) retinal image, then this particular level will never produce a more severe lesion as the image size is reduced.

It is an object of the present invention to provide a system for projecting a laser beam such that a human eye looking into the projector at the beam will not be damaged.

In conventional practices for modification of the divergence of the projected beam or for changing the projection aperture of a beam, single refracting or reflecting components are used in series. In these cases, the effective radiating area of the laser is either in or out of focus with reference to the far field. The apertures of such systems, when viewed from any range, will appear to be partially or totally filled with light. The filled portions will have the radiance of the laser itself (neglecting transmission and reflection losses). In all but a few trivial cases, such conventional projection techniques applied to basically unsafe lasers result in unsafe projection modes.

A key to the above problem lies in the fact that in any projection system, the radiance of any portion of the aperture of the projector cannot exceed the radiance of the source used in the projector. This statement can be made in photometric terms as follows: For any projection system, the luminance (brightness) of any portion of the aperture of the projector, whether in or out of focus, cannot exceed the luminance (brightness) of the source used. Thus, for a carbon-arc searchlight, an observer may view the mirror of the searchlight directly or with binoculars, and he will see some portions (or all portions) of the mirror of the searchlight that are bright, and the brightness of these portions cannot exceed the brightness of the carbon arc itself.

It is another object of the present invention to provide means for decreasing the radiance of a laser beam projector aperture without substantially reducing the total projected radiation and a further object to reduce the aperture radiance so that the beam can be safely viewed directly or with magnifying aids such as binoculars.

The technique for achieving safe projection, set forth herein, is based on the argument that the scattered radiation from an irradiated surface has a radiance that is different than that of the irradiating source. However, if the radiation from the irradiated surface is scattered by the surface into a hemisphere, projection optics with a numerical aperture equal to unity are required to project the radiation efficiently. Such a system might be a deep parabola having a diameter many times its focal length. For some applications, such a system is not particularly desirable because it uses a very large and fast parabola that is expensive to build, but, more importantly, the design has required that the laser energy falling on the scattering or diffusing surface be concentrated in a spot so small that the surface may be damaged by the laser flux. In addition to these objections, it should be noted that when a very fast parabola is used to project flux from a disc of uniform brightness, the far-field energy distribution achieved is spread out in a manner appropriate to the off-axis aberrations of the parabola. Thus, the anticipated illumination in the far field will only be achieved on axis and the flux will be spread out beyond the divergence cone required. It also should be noted that, because of the cosine law appropriate to diffusing surfaces, the outer portions of the aperture of the parabola will receive less flux from the scattering surface than the center of the parabola.

Certain embodiments of the present invention avoid using a large, fast parabola and the above objections, and still preserve the safe features achieved by scattering the laser flux before projection, with a "pseudoscattering" surface. This surface is made up of a mosaic of tiny concave mirrors, or the equivalent, each having an F/number equal to the F/number of the projection optics. The mosaic is built up in a honeycomb format and is assembled so that the total surface of the pseudoscatterer is filled by the mirrors. The light incident on the pseudoscatterer from the laser is essentially parallel and that portion of the light which is incident on an individual tiny mirror is caused to converge to a focal point, by reflection from the mirror, and then to diverge until incident upon the projection mirror. Since the F/number of the tiny mirrors is the same as the F/number of the projection mirror, all of the light incident on the pseudoscatterer is spread out uniformly across the surface of the projection mirror. The projection mirror focuses the suface of the pseudoscatterer to infinity.

Other objects of the present invention not gained by prior laser projection systems are to project the beam in such a way that the smallest image containing the laser radiation incident on the eye is that of the aperture of the projector and to project in such a way that beam divergence can be controlled without changing projection aperture.

Other and further objects and advantages of the present invention will in part be obvious and will in part be apparent from the following detailed description, the accompanying drawings, and the appended claims.

FIG. 6 illustrates schematically a second projector embodiment using a forward pseudoscattering device and a projection lens;

FIGS. 7 and 8 illustrate two type of forward pseudoscattering devices that can be used;

FIGS. 9 and 10 illustrate schematically third and fourth projector embodiments using, respectively, reflective and forward conventional scattering devices;

FIG. 11 illustrates the forward conventional scattering device and divergent reflectant cone; and FIG. 12 is a graph useful in determining design parameters of the projectors of the present invention.

Figure 1:
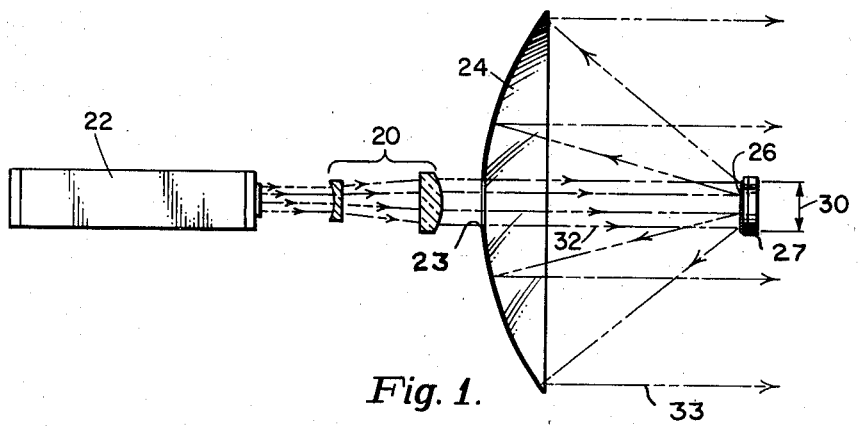
FIG. 1 illustrates a schematically one projector embodiment of the present invention.
Figure 2:
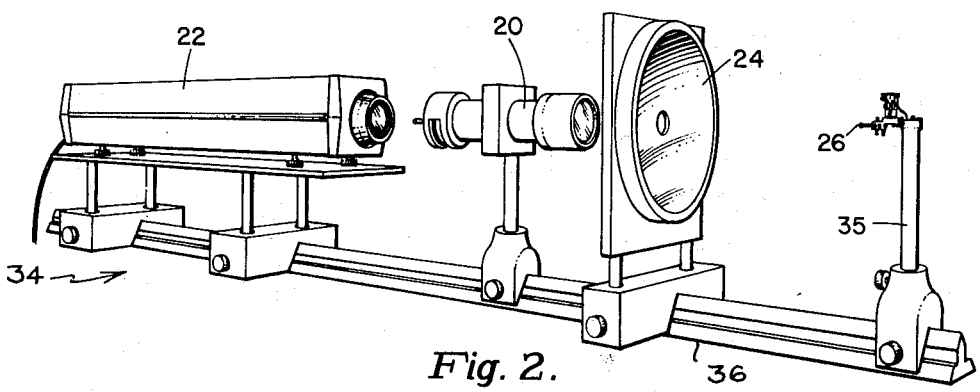
FIG. 2 is a perspective view of the embodiment in FIG. 1.

One embodiment of the laser projector shown in FIGS. 1 and 2 employs a reflective pseudoscattering surface directing radiation to a parabolic projector mirror. As shown in these figures, beam directing optics 20 projects the beam from laser 22 through the hole 23 in parabolic mirror 24 to a specially prepared reflective pseudoscattering surface 26 on a disc 27, which will be described below. Directing optics 20 is illustrated and described herein as comprising beam expanding optics. In some applications optics 20 could as well be beam compressing optics or could be eliminated altogether without altering the basic principles of this projection technique. In the latter event the laser cavity itself is construed herein to comirpse beam directing means. Light reflected from surface 26 diverges to fill parabolic mirror 24. Surface 26 is located at the focal plane of mirror 24 and hence the light reflected by mirror 24 is projected into a beam as in a searchlight. If the focal length of mirror 24 is F and the laser spot size on scattering surface 26 has a diameter D, then in the far field of this projection system the beam diameter will be $D/F$ radians. As an illustration, F might be 500 mm. and D 5 mm., so that in this case, the divergence of the beam would be 10 milliradians.

Figure 4:
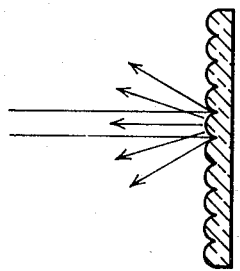
FIGS. 4 and 5 illustrate two types of reflective pseudoscattering devices that can be used.
Figure 3:
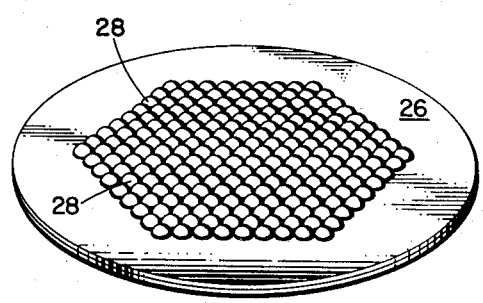
FIG. 3 is a perspective view, greatly expanded in size, showing the reflecting scattering device used in the embodiment of FIG. 2.
Figure 5:
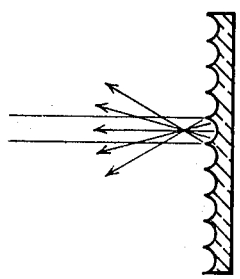

The detailed structure of surface 26, shown in FIG. 3, is critical to the efficiency of the projector. Surface 26 is made up as a mosaic of tiny reflectors 28 which may be concave as shown in FIG. 4 or convex as shown in FIG. 5. In the simplest design, these would be spherical. The F/number of each of these tiny spherical reflectors 28 is equal to the F/number of the large parabolic projection mirror 24 and so to a very good approximation, the parallel light 32 from beam expanding optics 20, upon reflection from the mosaic mirrors 28 on surface 26, effectively diverges from surface 26 in such a way as to just fill mirror 24. The size of each of the mosaic mirrors 28 can be in the range of 10 to 15 microns in diameter if desired. Thus, if the diameter 30 of expanded beam 32 is 5 mm. and the average diameter of one of the mosaic mirrors 28 is 15 microns, there will be about 100,000 mirrors involved on surface 26. Except for reflection losses and losses incurred by imperfections in the mosaic mirror system, all of the energy emitted by laser 22 is projected by this projector into a beam 33 of divergence which is controlled by the characteristics of beam expanding optics 20. A variable expanding optics system such as zoom optics can be used at this place in the projector so that the divergence of the beam can be adjusted with ease.

Referring again to FIG. 3, a suitable scattering surface 26 may be formed on a thin gold sheet as a closely packed pattern of spherical reflecting segments 28 indented by a hardened steel ball bearing. The pattern can be impressed on the gold target by a peening process; the steel ball being held in the end of vertical rod free to slide in a straight sleeve against a peening ball resting on the gold. A small ball bearing weight dropped through sleeve striking the end of rod indents the gold. To produce the multiplicity of dimples, the gold substrate is moved to a new location each time prior to dropping the ball bearing.

Uniformity of impulse is guaranteed by dropping the ball bearing weight through a fixed height each time. To prevent its bouncing several times on the end of the rod, a magnet may be employed to deflect, catch, and hold it on the first rebound.

FIG. 2 shows an example of the projection apparatus described schematically in FIG. 1 mounted on an optical bench 34, each of the components being supported by typical bench equipment such as the holder 35 for the pseudoreflective surface 26. The components are slideably supported along the bench rail 36.

The scattering surface 26 prepared as described above was placed at the focal point of parabolic $f/1.0$ mirror 24 of 254 mm. diameter, and the surface 26 was illuminated with the beam from a three milliwatt helium-neon laser 22 expanded to about 2.5 mm. diameter by beam expanding optics 20. The radiation scatters from surface 26 so as to fill parabolic mirror 24 with very little loss outside the aperture of this mirror. Investigation of the projected beam demonstrates that gold scattering surface 26 fulfills the requirements for the safe laser projector heretofore described.

The advantages of the pseudoscattering surface can also be obtained in a forward scattering system such as shown in FIG. 6. The expanded laser beam 32 from the expanding optics 20 illuminates the forward pseudoscattering disc 37 which transmits the light, scattered just sufficiently to fill the projection lens 38 with radiation 39. The disc 37 is transparent and is a mosaic of tiny lenses which may be concave as shown in FIG. 7 or convex as shown in FIG. 8. The divergence of the projected beam 40 may be controlled by varying the expanding optics system 20.

As already described, advantages of the present invention are achieved by the use of a special scattering or pseudoscattering surface within the optical train of the projector. For purposes of controlling the energy density or power density in the image formed by an optical system in the far field, the scattering or pseudoscattering surface must have essentially uniform radiance over the solid angle subtended to the scattering surface by the projection optics. For purposes of efficiency of the optical projector, the radiance of the pseudoscattering or scattering surface must be approximately zero outside this cone.

A conventional scattering surface can be used in connection with a divergent reflectance cone to achieve the requirement of uniform radiance over a limited solid angle about the normal to the axis of such an optical system. FIGS. 9 and 10 illustrate this technique. In FIG. 10, laser 22 projects its beam to illuminate a disc 43 of forward scattering material such as flashed opal glass or ground glass. The area so illuminated is considered here to be circular and of area $a$. This area of scattering material is attached to a divergent truncated cone 44 (shown also in FIG. 11) with reflecting internal surfaces. The area of the small end of the cone is equal to $a$ and is attached directly to the corresponding area of the scattering disc 43. The area of the large end of the cone is equal to A. The length of the cone is several times the diameter of the large end. It is a characteristic of such reflecting cones that the product of the radiance, R, the area, $a$, and the weighted solid angle, $w$, into which the surface radiates is equal to the area of the large end of the cone, A, its apparent radiance, R*, and the solid angle, $\Omega$, into which radiation is projected from that large end. This is expressed in the following equation. $awR = A\Omega R^*$. For a perfectly diffusing surface the weighted solid angle into which scattering occurs is $\pi$ steradian.

The solid angle into which the radiation diverges from the large end of the cone is given by $$\Omega = \frac{Ra}{R^*A}\pi$$

steradians.

If reflection losses are neglected, then within the solid angle $\Omega$ the apparent radiance of the large aperture will equal the radiance of the scattering surface. Under these conditions $\Omega$ is given by the equation $$\Omega = \frac{a}{A}\pi$$

If there are reflection losses, they will result in a reduction in the apparent radiance of the large aperture, but not in a modification of $\Omega$.

Radiation 45 from the large end of the cone fills the projection lens 46. This design, combining a forward scattering material and a divergent cone, meets the requirements for a focal plane having a controlled radiance throughout a controlled solid angle.

FIG. 9 illustrates a similar technique for achieving the same end. In this case a backscattering surface is used, such as magnesium oxide, a magnesium carbonate block or de-polished opal on the disc 52. The divergent cone 53 is attached to this surface as shown in the figure, and all of the arguments given above with respect to FIG. 10 hold for this situation. The radiation 54 from the large end of cone 53 fills the projection mirror 24 which can be safely viewed.

The safety requirements of the projector systems described herein can be stated in terms of the radiance of the projector aperture. Safety requires that the flux density in the retinal image of this aperture shall not exceed some value. Thus, in FIG. 1, the diameter of mirror 24 can be selected so that the radiance of this aperture meets the safety standard. Utilization of the mosaic 26 in the projector system permits safe designs to be achieved in a number of cases where previously this was not possible. The following calculations illustrate parameters and values for one application of the projector of the present invention. The problem posed is to determine the aperture, specifically allowing for transmission losses, as for a given energy density in the resolved image of the aperture on the retina.

For all situations in which an observer can form a resolved image of the projector aperture on his retina, the retinal energy density can be expressed in terms of the radiance (here, the time integral of radiance) of the aperture, specifically allowing for transmission losses, as follows:

$$Q_R = \frac{16J}{\pi^2 (D_L \theta)^2} \cdot \frac{\pi}{4} (nD_p/f)^2 \cdot T_A \cdot T_o \cdot T_p$$

where:

$J$ = laser 22 pulse energy (joules)
$D_L$ = diameter of laser projector aperture (cm.)
$D_p$ = diameter of pupil of observer's eye (cm.)
$\phi$ = divergence of projected beam (radians)
$f$ = focal length of eye (cm.)
$n$ = index of refraction of ocular media
$T_A$ = collimated transmission of air path from projector to observer
$T_o$ = transmission of ocular media
$T_p$ = transmission of laser beam projection system
$Q_R$ = retinal energy density (joules/cm.$^2$)

The retinal energy density, $Q_R$, is thus independent of the projector-observer distance (except for atmospheric transmission losses) out to a distance such that the aperture appears to be an unresolved point source. At greater distances, the retinal energy density will decrease by the inverse square law (again, multiplied by atmospheric transmission).

The above equation is solved for $D_L$, the diameter of the projector aperture, to give $$D_L = \frac{2}{\sqrt{\pi}} \cdot \sqrt{T_A} \cdot \frac{nD_p\sqrt{T_o}}{f} \cdot \frac{1}{\sqrt{Q_R}} \cdot \frac{\sqrt{JT_p}}{\phi}$$

Here, the expression for $D_L$ has been factored into the following:

(1) a pure number, $2/\sqrt{\pi}$,
(2) the effect of atmospheric transmission, $\sqrt{T_A}$,
(3) a factor depending upon the characteristics of the eye, $nD_p\sqrt{T_o}/f$;
(4) a factor depending upon retinal energy density, $1/\sqrt{Q_R}$;
(5) a factor depending upon the characteristics of laser 22 and the projection system, $\sqrt{JT_p}/\phi$.

Where for example, the laser is a neodymium laser projecting a 0.1 joule pulse into a 5 milliradian beam, at modest distances from the projector to the observer, the atmospheric transmission may be taken as unity. For the 1.06 micron wavelength of this laser, the transmission of the ocular media is about 0.7, and the index of refraction is about 1.3. The focal length of the eye is about 1.7 cm. Thus:

$T_A = 1$
$T_o = 0.7$
$f/n = 1.7$ cm./$1.3 = 1.3$ cm.
$J \cdot T_p = 0.1$ j./cm.$^2$
$\phi = 5 \times 10^{-3}$ rad.

Substituting these values in the expression above for $D_L$ the following is obtained:

$$D_L = 45 \frac{D_P}{\sqrt{Q_R}} \text{ cm.}$$

This equation is plotted in FIG. 12 for values of $Q_R$ from $10^{-2}$ to 1 joule/cm.$^2$, and for various values of pupil diameter. The pupil diameters have been chosen for typical daytime (1.5 mm.), twilight (4 mm.), and a very dark night (7 mm.) conditions.

Selection of properly safe values of $Q_R$, the retinal energy density, for specific modes of laser operation can now be made. A typical "threshold" value for $Q_R$ is 0.15 joule/cm.$^2$ for Q-switched neodymium laser pulses. Specifically, this number applies for monkeys. The extrapolation of this datum to a non-injurious value applicable to man cannot be made with great confidence. However, such "safe" values as 0.05, or the even more conservative 0.01, joules/cm.² are often employed. As may be seen in FIG. 12 these values, particularly the latter, lead to rather large values for the projector aperture diameter, even for the daylight case (1.5 mm. pupil). However, for normal-mode laser pulses, these "safe" values of retinal energy density can be increased by an order of magnitude. The required projector diameter is thus reduced to a more reasonable value.

Atmospheric turbulence causes random minor deviations in portions of a projected beam. The result of this is random fluctuations in the intensity at any point in the far field of the beam. For safety purposes, one must anticipate these turbulence induced fluctuations, and set the safety standards on the basis of the maximum possible turbulence induced concentrations of radiant energy. The effective diameter of the turbulent cells is on the order of a few centimeters, and it has been shown both theoretically and experimentally that if the projection aperture is larger than this, then the fluctuations in the far field are reduced in a statistical way. Thus, in projecting a laser beam for 2 km., effective cell size is approximately 3 cm. If a laser beam is projected from an aperture less than 3 cm. in diameter, the rms fluctuations at some point in the far field may be of the class of 30 percent. Now, however, if the beam is projected from an aperture of 30 cm. diameter, the fluctuations in the far field will be reduced approximately 10-fold or down to 3 percent.

The projection technique proposed here involves a large apertures and hence far-field fluctuations induced by turbulence will be markedly reduced as compared to those which would be encountered in the conventional laser projection methods.

Because of the monochromatic nature of the light from most lasers, the far-field patterns are usually highly structured as a result of the complicated interference effects induced by mode structures of the laser, less than perfect projection optics, and turbulence phenomena. In many projection problems these effects could be eliminated if only the time coherence of the projected laser beam could be destroyed during a significant time in the projection process. Random, high frequency deformations of the scattering surface would achieve the desired result. Typically, one might wish to achieve a relative displacement between two points on the surface of about one wavelength in a time of the class of one microsecond. This leads to relative velocities of the order of one meter per second, which would appear to be achievable by available techniques. One solution to this problem is to mount the scattering surface on a piezoelectric crystal driven by high frequency noise.

With conventional projection techniques applied to lasers, the eye can always focus the flux entering the pupil into a spot on the retina limited only by diffraction and lens aberrations. It is this fact which leads to the very real eye hazard associated with the use of various laser devices. The solution to this problem, herein disclosed, is the projection of the laser beam from a large aperture with appropriate reduction in beam coherence such that the smallest retinal image which can be formed is that of the projector aperture. By proper selection of the radiance of this aperture, the retinal energy density can be limited to non-injurious values, and safety is assured at all ranges.

While the embodiments of the invention described herein illustrate simple coaxial arrangements of the various elements, it is obvious that off-axis optical systems, folded optical systems and other compound systems can be devised to accomplish the desired objects. Hence the disclosed embodiments are not intended to limit the spirit and scope of the invention as set forth in the accompanying claims.

What is claimed is:
1. Aparatus for projecting a beam of coherent radiation, comprising:
    a source of intense radiation for generating the beam having a single coherent wavefront;
    beam directing means, for:
        directing the radiation as a beam, of relatively small transverse dimension, having a single coherent wavefront, and
        changing the diameter of the beam while substantially maintaining the single coherent wavefront;
    projection means of relatively large transverse dimension having a given focal point associated therewith;
    beam intercepting means, located at the given focal point, for
        subdividing the single coherent wavefront into a plurality of coherent wavefronts, and
        scattering substantialily all of the intercepted subdivided coherent wavefront radiation, within a solid angle, toward the projection means;
    the projection means collecting substantially all of the scattered subdivided radiation from the intercepting means and directing the collected scattered subdivided plurality of coherent wavefront radiation toward a target, as a beam.

2. Apparatus as in claim 1 and in which, the projection means is a curved mirror.

3. Apparatus as in claim 2 and in which, the mirror is parabolic in shape.

4. Apparatus as in claim 3 and in which, the beam intercepting means is reflective and the beam directing means directs radiation to the reflective beam intercepting means through an opening in the parabolic mirror.

5. Apparatus as in claim 4 and in which, the reflective beam intercepting means is a surface consisting of a plurality of tiny reflectors arranged in a plane, each reflecting impinging light from the directed beam on substantially the whole reflecting surface of the mirror.

6. Apparatus as in claim 4 and in which, the beam directing means is variable for varying the diameter of the directed beam at the reflective beam intercepting means, whereby the divergence of radiation directed toward the targt is varied.

7. Apparatus as in claim 3 and in which, the reflective beam intercepting means is a surface at the small end of a diverging cone which is reflective on the inside and directing substantially all of the reflected scattered radiation from the surface to the mirror.

8. Apparatus as in claim 1 and in which, the beam intercepting means is transmissive.

9. Apparatus as in claim 8 and in which, the transmissive beam intercepting means consists of a plurality of tiny lenses arranged in a plane, each directing incident light from the directed beam on substantially the whole of the projection means.

10. Apparatus as in claim 9 and in which, the beam directing means is variable for varying the diameter of the directed beam at the transmissive beam intercepting means, whereby, the divergence of radiation directed toward the target is varied.

11. Apparatus as in claim 8 and in which, the transmissive beam intercepting means is at the small end of a diverging cone which is reflective on the inside and directing substantially all of the transmitted scattered radiation toward a projection lens.

12. Apparatus for projecting a beam of coherent radiation from a laser, along an axis, comprising:
    a parabolic reflector having a focal plane and a central opening, disposed with its axis coinciding with the axis of the beam and its reflecting surface on the side thereof opposite the laser;
    beam expanding optics disposed on the axis of the beam between the reflector and the laser and adapted to expand the beam;

the expanded beam passing through the central opening of the reflector; and a plurality of miniature reflector means located at the focal plane of the reflector, for:

subdividing the beam of coherent radiation into a plurality of coherent radiation beams, and scattering substantially all of the intercepted subdivided coherent radiation beams, within a solid angle, toward the parabolic reflector.

13. Apparatus as in claim 12 and in which, the F/number of each miniature reflector means is equal to the F/number of the parabolic reflector.

14. Apparatus as in claim 13 and in which, the beam expanding optics comprises zoom optics.

References Cited

UNITED STATES PATENTS

| | | | |
|---|---|---|---|
| 2,273,447 | 2/1942 | Ohl | 240—41.3 X |
| 3,363,196 | 1/1968 | Eknayan | 331—94.5 |
| 3,397,024 | 8/1968 | Boyden et al. | 350—199 |
| 3,407,294 | 10/1968 | Hill | 240—46.01 |
| 3,433,960 | 3/1969 | Minott | 350—199 |

JOHN M. HORAN, Primary Examiner

R. M. SHEER, Assistant Examiner

U.S. Cl. X.R.

350—167, 199; 331—94.5